US007022200B2

(12) United States Patent
Tayebi

(10) Patent No.: US 7,022,200 B2
(45) Date of Patent: Apr. 4, 2006

(54) METHOD OF MAKING ADHESIVE-FREE BONDED POROUS THERMOPLASTIC NIBS FOR MARKERS AND HIGHLIGHTER APPLICATIONS

(76) Inventor: Amad Tayebi, 5 Sequoia Rd., Westford, MA (US) 01886

( * ) Notice: Subject to any disclaimer, the term of this patent is extended or adjusted under 35 U.S.C. 154(b) by 238 days.

(21) Appl. No.: 10/338,419

(22) Filed: Jan. 8, 2003

(65) Prior Publication Data

US 2004/0051207 A1    Mar. 18, 2004

Related U.S. Application Data

(60) Provisional application No. 60/380,200, filed on May 13, 2002, provisional application No. 60/363,405, filed on Jan. 8, 2002.

(51) Int. Cl.
*B43K 1/12* (2006.01)

(52) U.S. Cl. .................. 156/180; 156/199; 156/296; 264/119; 264/172.15; 264/280

(58) Field of Classification Search ........ 156/180–181, 156/196, 199, 296, 580, 583.5; 264/109, 264/119, 122, 172.13, 172.15, 280; 425/371
See application file for complete search history.

(56) References Cited

U.S. PATENT DOCUMENTS

| | | | | |
|---|---|---|---|---|
| 2,543,101 A | * | 2/1951 | Francis, Jr. ................. | 442/278 |
| 3,079,978 A | * | 3/1963 | Cobb, Jr. et al. ........... | 156/441 |
| 3,111,702 A | * | 11/1963 | Berger ........................ | 401/199 |
| 3,180,778 A | * | 4/1965 | Rinderspacher et al. .... | 156/311 |
| 3,637,447 A | * | 1/1972 | Berger et al. ............... | 156/180 |
| 4,818,599 A | * | 4/1989 | Marcus ...................... | 442/333 |
| 4,869,275 A | * | 9/1989 | Berger ........................ | 131/332 |
| 5,284,704 A | * | 2/1994 | Kochesky et al. .......... | 442/364 |
| 5,491,186 A | * | 2/1996 | Kean et al. .................. | 524/13 |
| 5,607,766 A | * | 3/1997 | Berger ........................ | 428/373 |

FOREIGN PATENT DOCUMENTS

| GB | 2040801 A | * | 9/1980 |
|---|---|---|---|
| WO | WO 200132430 A1 | * | 5/2001 |

* cited by examiner

*Primary Examiner*—Sam Chuan Yao

(57) ABSTRACT

A method and an apparatus are described for making porous thermoplastic nibs which are adhesive-free and plasticizer-free. The method comprises the steps of feeding a coherent fibrous structure into a compacting, shaping and bonding die, heating the surface of the fibers uniformly by surrounding them with a hot fluid and causing their surfaces to become tacky and to develop a cohesive bond between the fibers.

1 Claim, 9 Drawing Sheets

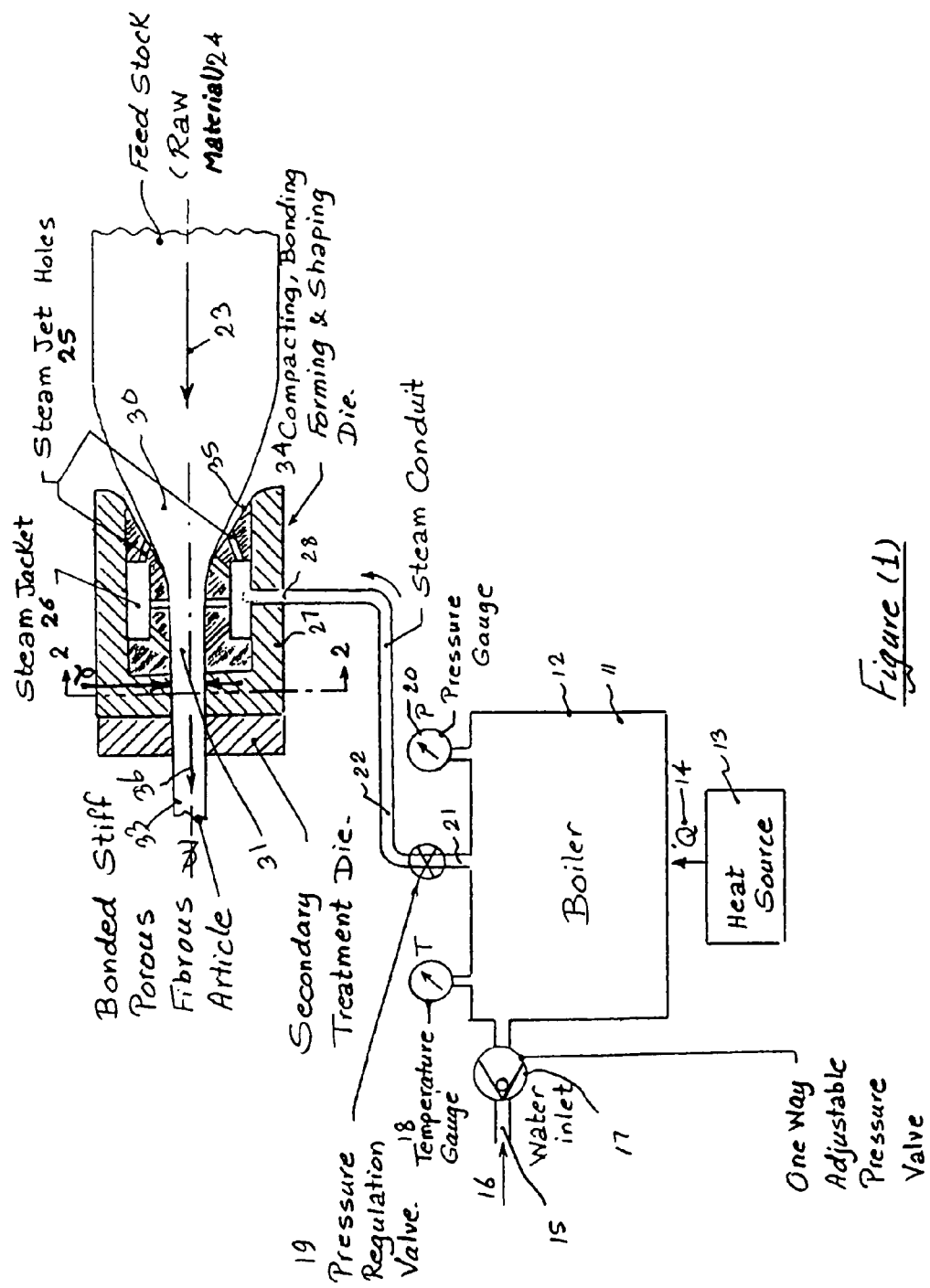
Figure (1)

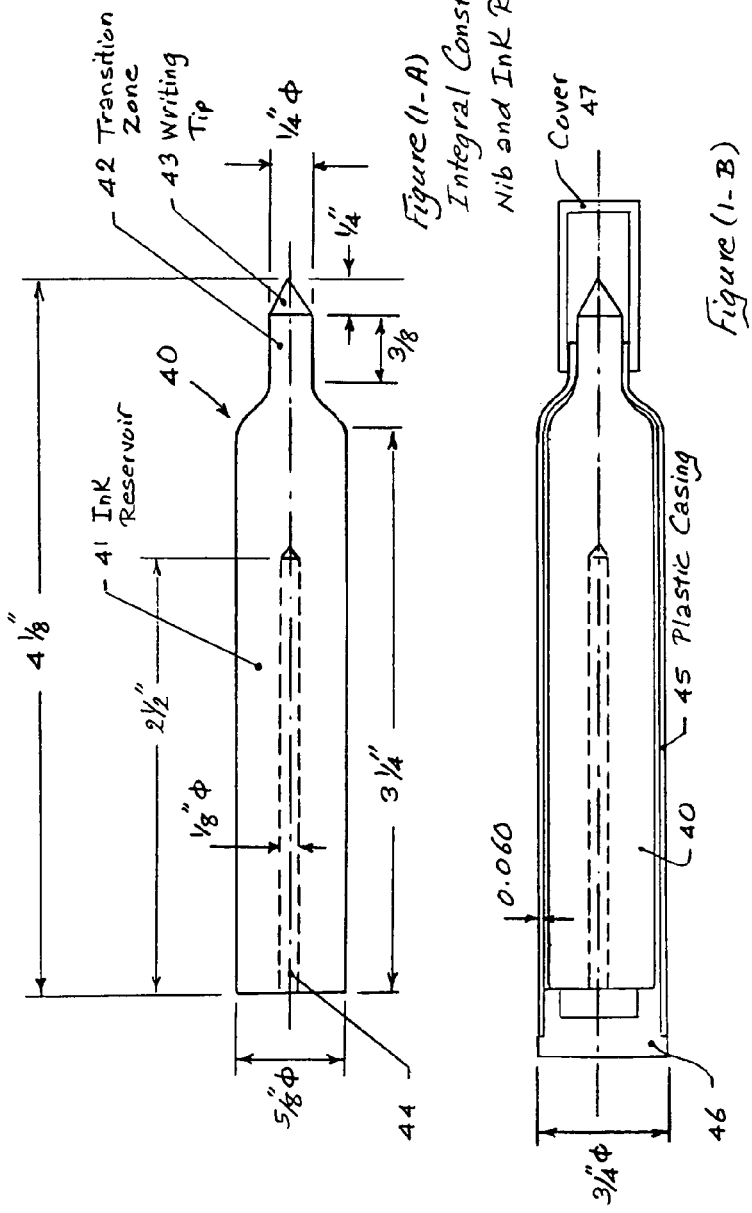

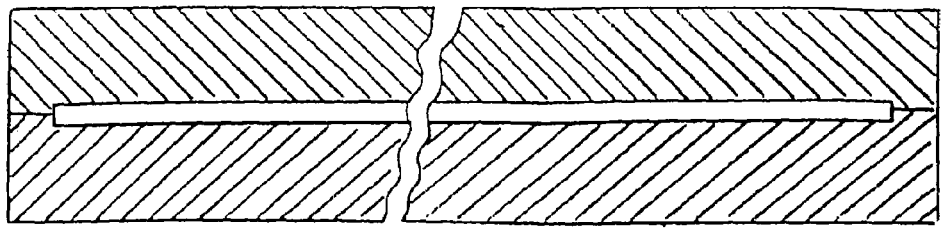
Figure (2-A)
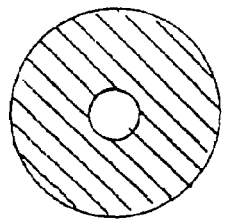　　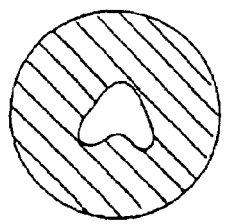　　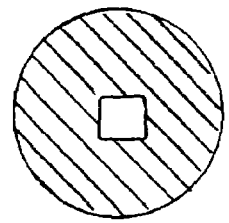
Figure (2-B)　　Figure (2-C)　　Figure (2-D)
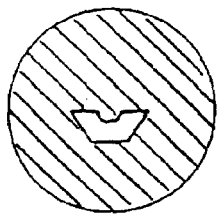　　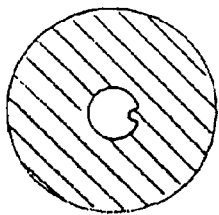　　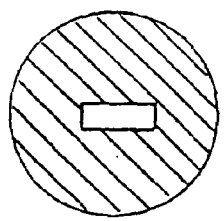
Figure (2-E)　　Figure (2-F)　　Figure (2-G)
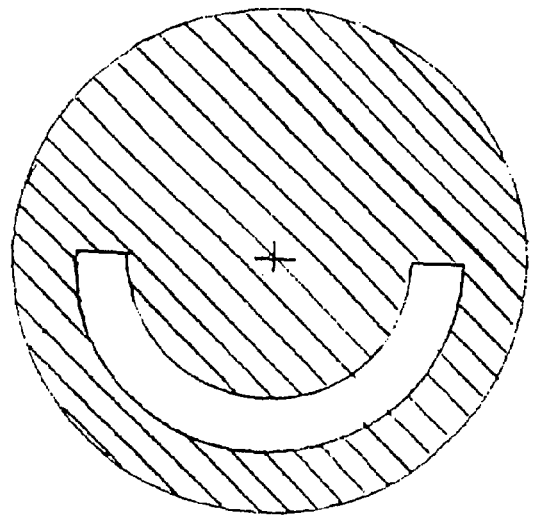
Figure (2-H)

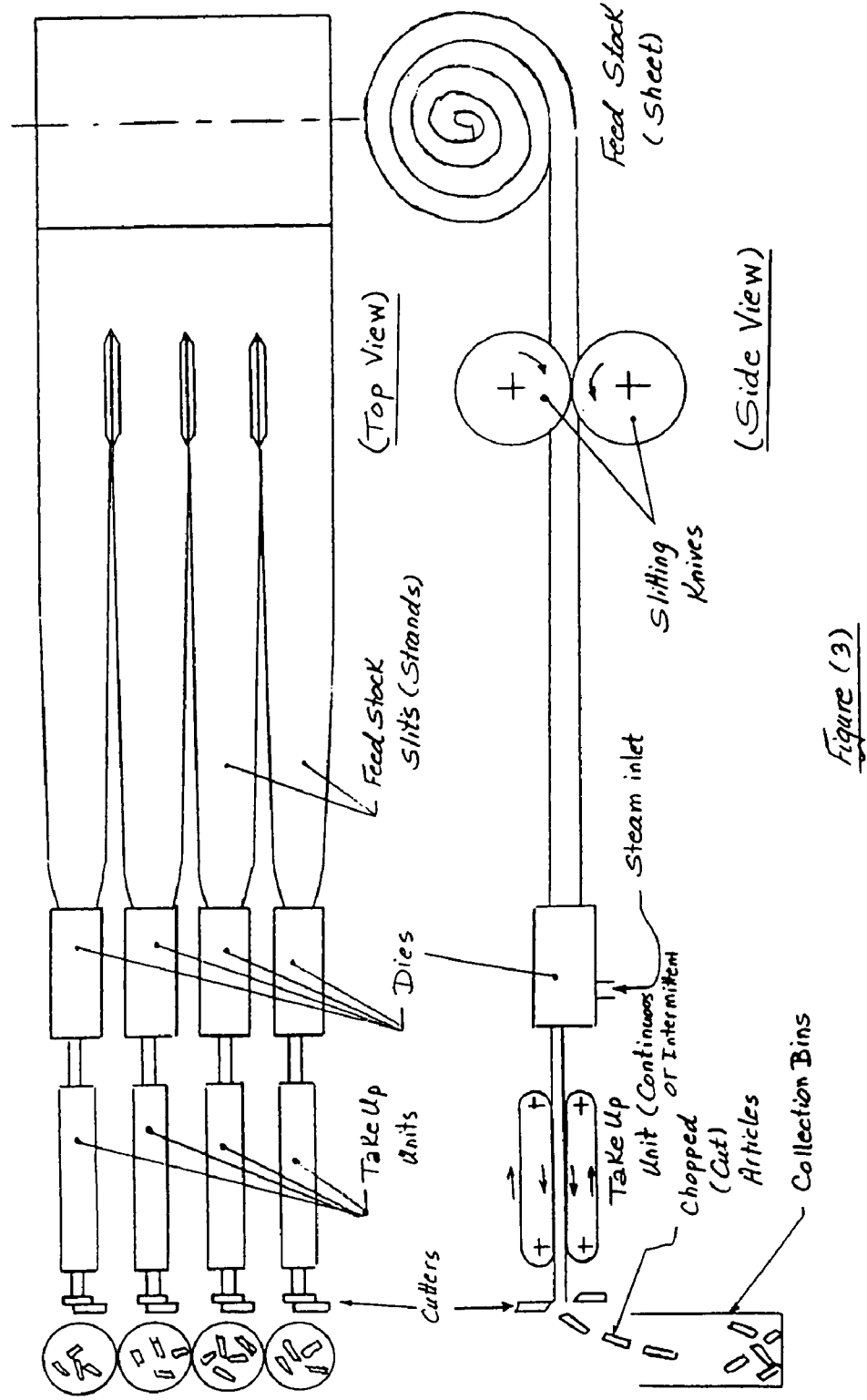
Figure (3)

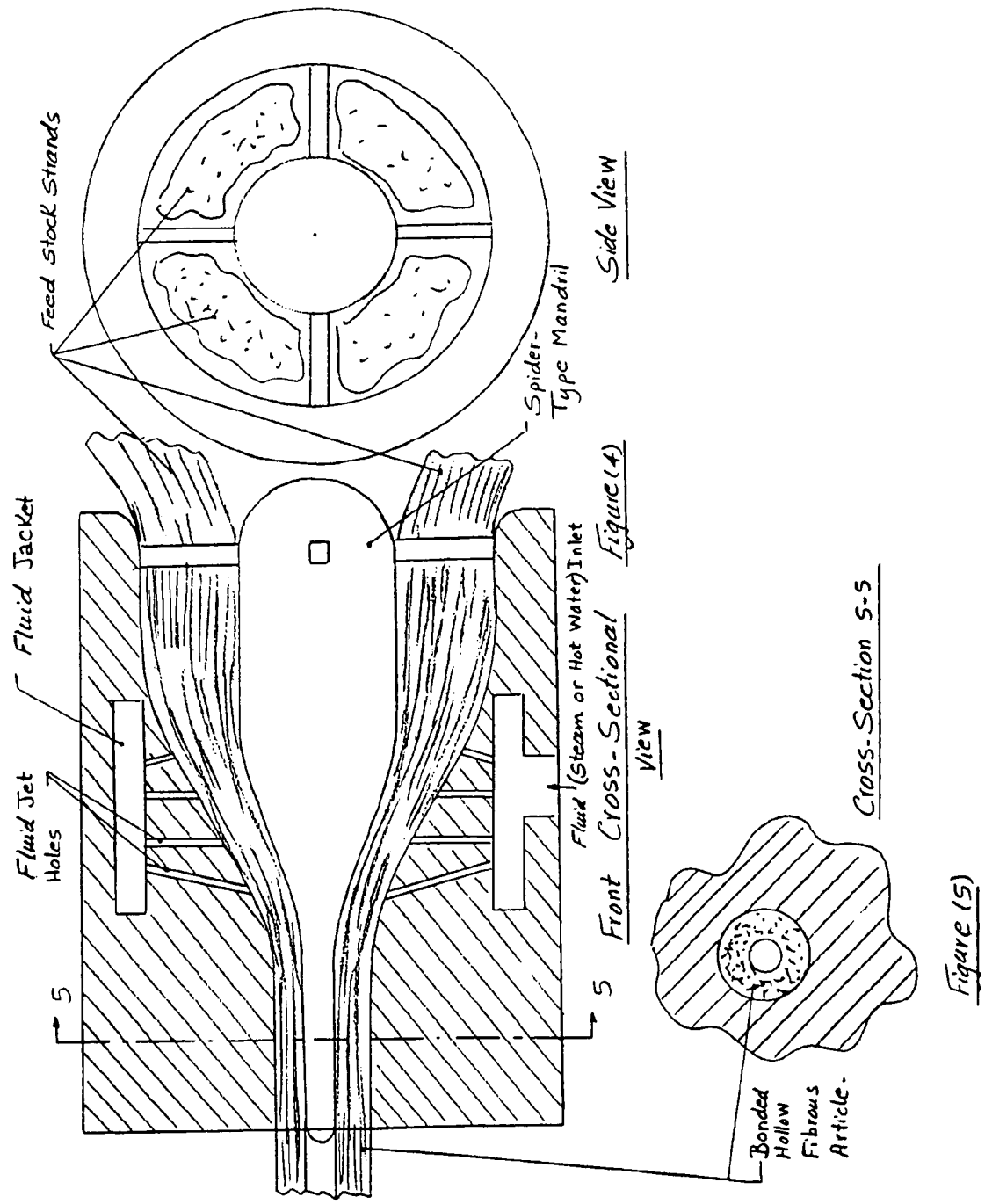

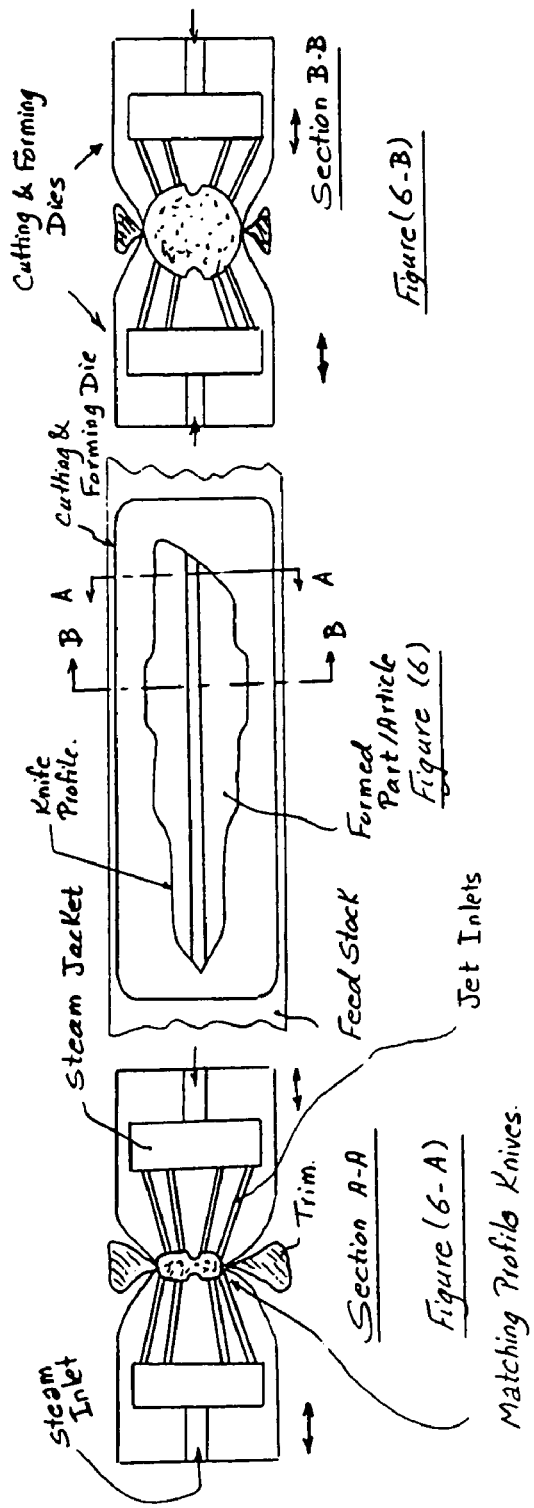

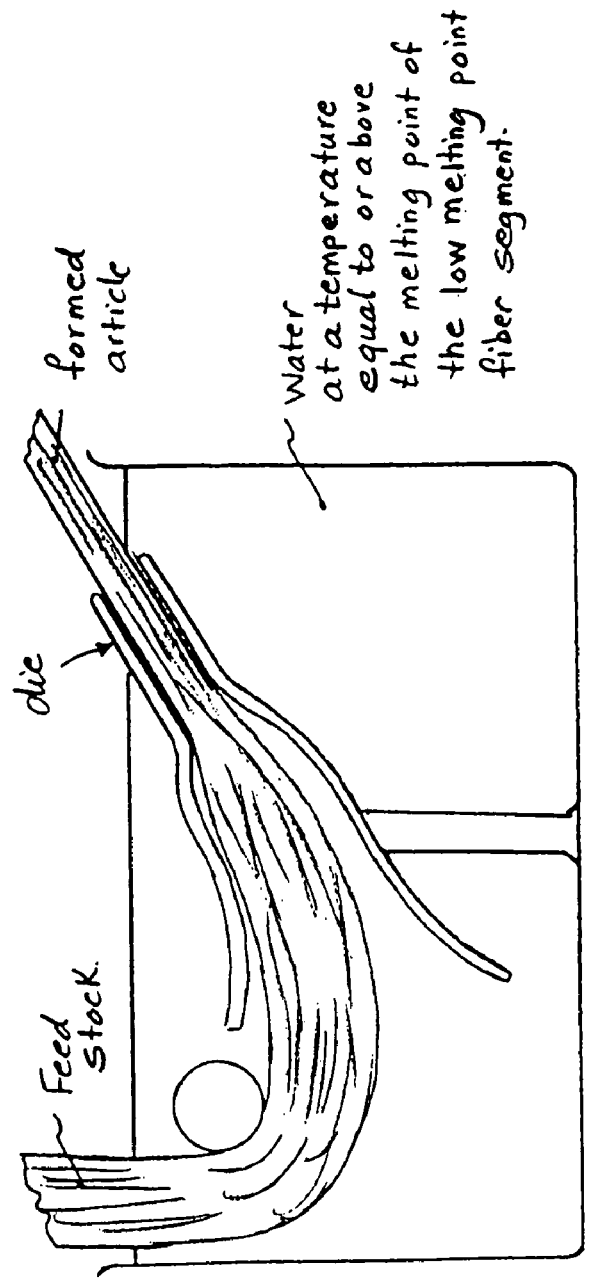
Figure (7)

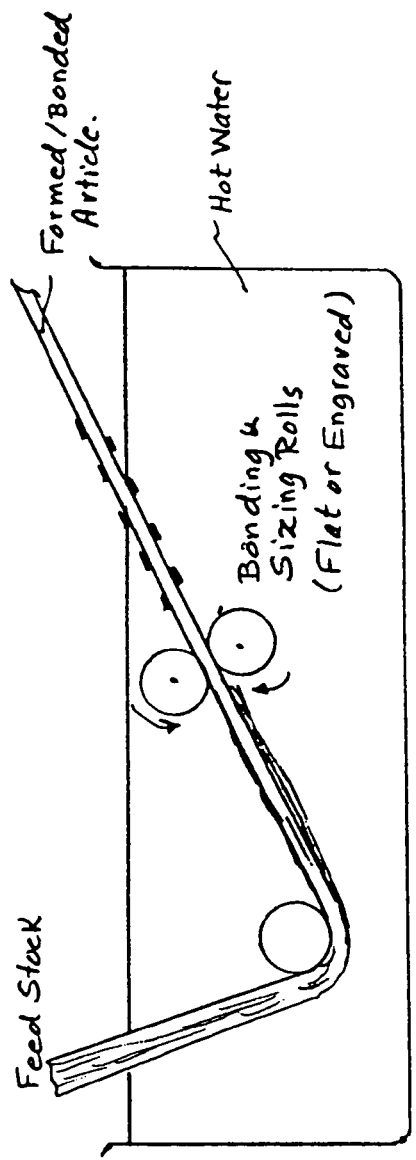
Figure (8)
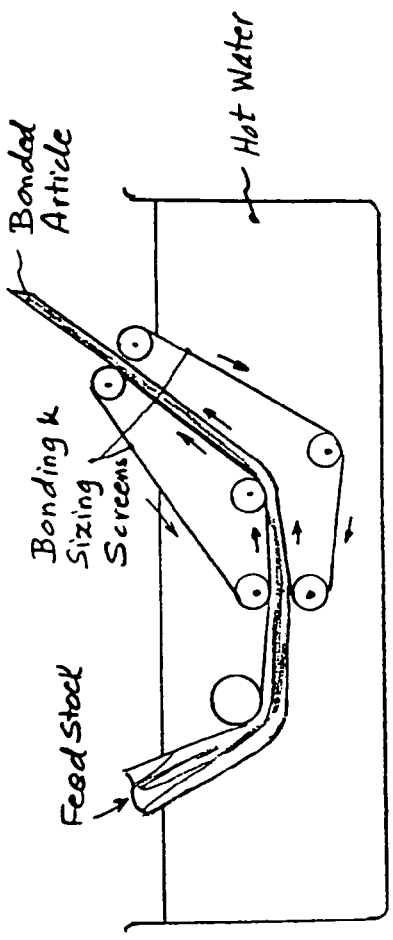
Figure (9)

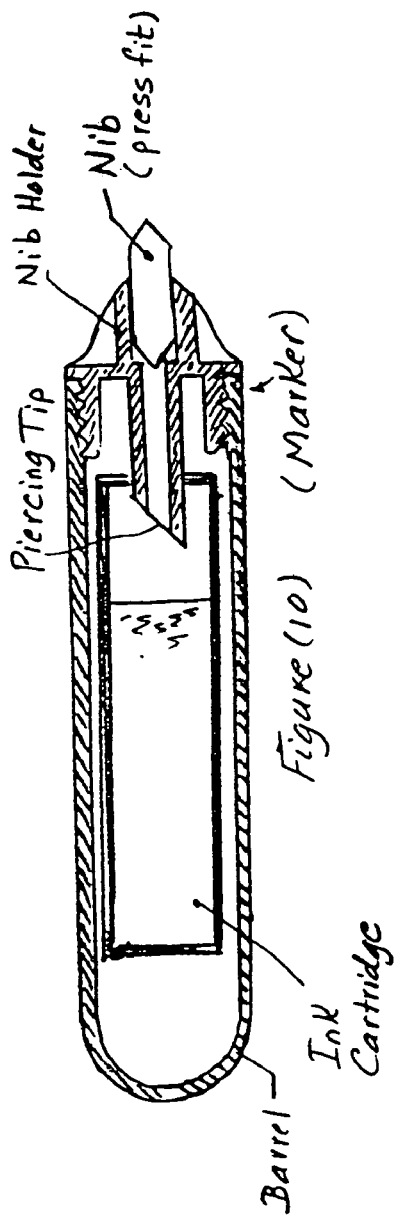
Figure (10) (Marker)
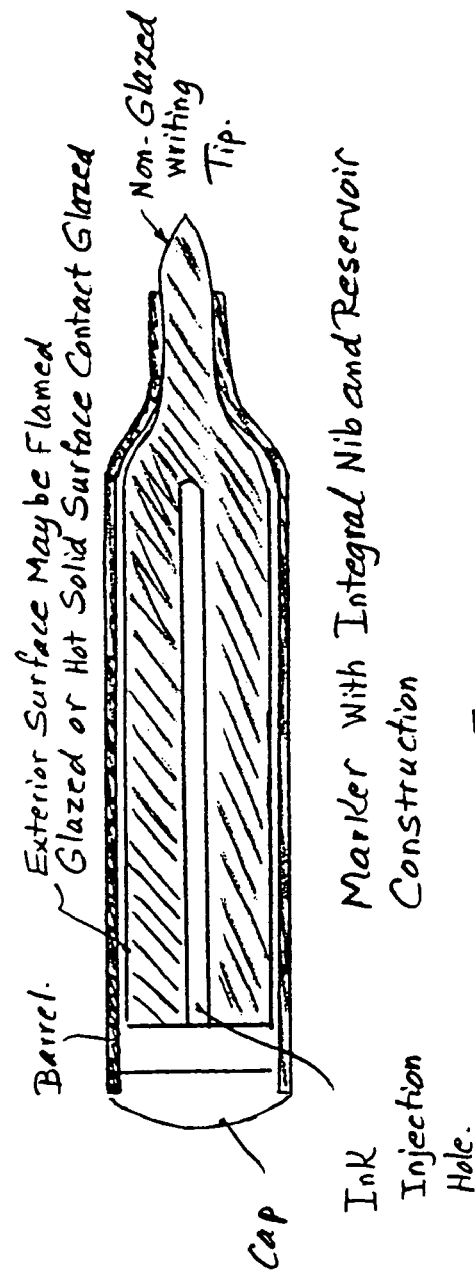
Figure (11)
Marker with Integral Nib and Reservoir Construction

METHOD OF MAKING ADHESIVE-FREE BONDED POROUS THERMOPLASTIC NIBS FOR MARKERS AND HIGHLIGHTER APPLICATIONS This application claims priority from Provisional Patent Application Nos. 60/363,405 and 60/380,200 filed on Jan. 8, 2002 and May 13, 2002 respectively, which are incorporated herein by reference and attachment.

BRIEF DESCRIPTION OF THE DRAWING

FIG. 1 shows invention apparatus showing compacting, bonding, forming and shaping die, feedstock (raw material) fed at one end and bonded stiff porous fibrous article exiting from the other end.

FIG. 1-A shows an integral construction nib and ink reservoir.

FIG. 1-B shows an integral unitary construction of ink reservoir and nib, placed in a plastic casing.

FIGS. 2-A through 2-H show a variety of shapes of cross-section 2—2 shown in FIG. 1.

FIG. 3 shows top and side views of invention apparatus showing path of feedstock (sheet), through slitting knives, feedstock slits (strands), through dies with steam inlets, through take up unit and cutters and chopped (cut) articles in collection bins.

FIG. 4 shows feedstock strands fed around a spider-type mandrel.

FIG. 5 shows cross-section 5—5 of FIG. 4, showing bonded hollow fibrous article.

FIGS. 6, 6-A and 6-B show cutting and forming dies, formed part/article and cycle.

FIG. 7 shows invention apparatus showing feedstock, through die in water and formed article.

FIG. 8 shows invention apparatus showing feedstock, fed between bonding and sizing rolls (flat or engraved) in hot water, and formed/bonded article.

FIG. 9 shows invention apparatus showing feedstock, fed between bonding and sizing screens, in hot water, and bonded article.

FIG. 10 shows a marker comprising a barrel, a nib holder, with a piercing tip, a nib and an ink cartridge.

FIG. 11 shows a marker with integral nib and reservoir construction.

DETAILED DESCRIPTION OF THE INVENTION

In accordance with the present invention, a method and an apparatus are described for making adhesive-free and plasticizer-free bonded polymeric thermoplastic articles, thermoplastic porous fibrous articles and other similar adhesive-free and plasticizer-free thermoplastic articles of manufacture. The products of the disclosed method and apparatus are adhesive-free and plasticizer-free bonded polymeric porous stiff thermoplastic articles of manufacture.

FIG. 1 shows an apparatus 1 and a method for forming, bonding and shaping an adhesive-free and plasticizer-free polymeric bonded thermoplastic articles, bonded thermoplastic porous fibrous articles and other similarly-formed, bonded and shaped adhesive-free and plasticizer-free articles of manufacture. As shown therein, feedstock or raw material 24 is fed in direction of feed arrow 23 into die 34. In one embodiment of the present invention, feedstock 24 is a coherent fibrous structure which may be in the form of a continuous multifilament yarn, a continuous filament tow, a tow in which at least some of the filaments are broken or discontinuous, a sliver, a braided structure, a roving, a combing process roll, a fibrous web or mat made of continuous or staple fibers, including melt-blown fibers, or a blend of continuous and staple fibers, a staple yarn, a rope, a strand or any other fibrous structure held together by continuity of its fibers/filaments or by interfiber mechanical or frictional forces. A yarn may also be a single, ply, interlaced, twisted or a zero twist yarn. A web may also be a needled, unneedled, bonded or unbonded nonwoven sheet.

Alternatively, feedstock 24 may be in the form of polymeric thermoplastic slit film strands, a polymeric thermoplastic film or layers of polymeric thermoplastic films, chips of polymeric thermoplastic material such as shredded or ground chips obtained in recycling beverage bottles and other containers, typically made of polyethylene, polypropylene, polyester (polyethylene terephthalate), polyvinyl chloride, polystyrene or other thermoplastic polymeric materials.

As an example, in order to make a nib for markers and highlighter applications, having a porous fibrous structure and capable of transmitting or transporting fluid through its body by wicking or capillary action, a lightly needled nonwoven web made of 100% polyethylene terephthalate bicomponent fibers is fed through die 34. In this particular example, the bicomponent fibers have a sheath layer made of polyethylene terephthalate with a melting point of 110 degrees Celsius, which is lower than the melting point of the core or remaining portion of the fiber.

In another example for making a lintless tampon for feminine hygienic applications, feedstock 24 comprises a plurality of continuous thermoplastc filaments and a plurality of continuous cellulosic filaments (e.g., viscose rayon or cellulose acetate fibers) intermingled with one another.

Compacting, bonding, forming and shaping die 34 receives feedstock 24 in a low density (high bulk) state in its inlet zone 35 which is tapered, i.e., reduced in cross-sectional area, as feedstock 24 travels in direction of take-up direction arrow 36, thus compacting feedstock 24 in order to bring its constituent fibers, filaments, slit film strands, films or chips in closer contact with one another in preparation for bonding.

Hot water, in liquid, vapor or a mixture of liquid and vapor form, coming from boiler 12 is fed into die 34 through inlet 28 which feeds optional water jacket 26 which, in turn, feeds optional water jet holes 25. As hot water, emerging from jet holes 25, surrounds feedstock 24, it rapidly and uniformly heats at least the surface of its constituents (which may be in the form of fibers, filaments, slit film strands, films, chips or other forms) to a temperature sufficient to cause their surfaces to become at least tacky, i.e., becoming slightly adhesive, gummy to the touch or having surface stickiness thus being able to adhere or bond to one another when brought into contact with one another at contact or cross-over points. It is worth noting here that higher temperature water may be used to increase the degree of tack or stickiness of the surface of the constituents of feedstock 24. However, in accordance with the present invention, the minimum requirement for bonding the constituents of feedstock 24 is to effect or cause tackiness of at least a portion of the surface of at least a portion of said constituents. Alternatively, inlet 28 feeds hot water directly into the interior of die 34 which immediately and uniformly surrounds feedstock 24 and heats at least the surface of its constituents.

For example, saturated steam generated at nearly atmospheric pressure, i.e., at a temperature near 100 degrees Celsius, has been used successfully to bond sheath-core type bicomponent filaments having a sheath material melting point of 110 degrees Celsius and a higher melting point core material. The bicomponent fibers used in this example were commercially available fibers, known as type K54 fibers which were marketed by Hoechst-Celanese company. Similar sheath-core fibers are also available in continuous filament tow as well as in staple fiber form from Fiber Innovation Technology in Johnson City Tenn., for example fiber type T-201. Likewise, saturated liquid water heated at nearly atmospheric pressure was used successfully to bond the above-mentioned bicomponent fibers.

The fibers were fed in the form of a lightly needled nonwoven web comprising a 50/50 blend of 2 denier 1.5" staple length and 4 denier 2" staple length fibers. A strip of 8 ounces per square yard(oz/sq.yd.) basis weight and 1" width was fed in die 34 having a sizing diameter d=11/64" (0.172") which produced a marker nib of density=0.39 gram/cubic centimeter (gm/cc) and a nib diameter of 0.170" to 0.175". The formed nib has a bending rigidity which is much higher than that of the unbonded feedstock and is suitable for use in markers and highlighters. The nib is also capable of absorbing and retaining ink, in an amount at least equal to its own dry weight and writing smoothly and had no surface glazing (which is defined as impermeable film or membrane formation or generally formation of a non-fibrous surface structure) on its exterior surface that was in contact with the interior surface of die 34. The absence of surface glazing is very desirable and, in some instances essential, since a glazed surface deteriorates the writing quality of the nib, generates objectionable writing noise and blocks the transfer of ink from and/or through the nib. In accordance with the present invention, surface glazing and non-uniform bonding of fibers of feedstock (whether on the surface of the bonded article or within the bonded article) are avoided by maintaining the temperature of die 34 at a temperature not exceeding the temperature of hot water fed into die 34 through inlet 28 and allowing the formed article (nib) to cool down, upon exiting from die 34, preferably before contacting other solid surfaces. Other nibs were similarly produced from lightly needled 8 oz/square yard nonwoven sheet strips. For example, feeding strips of width of 0.75, 1.17" and 2.1" in dies having sizing diameters d of 0.150', 0.187" and 0.250", respectively yielded similar uniformly bonded, surface-glaze-free nibs with similar excellent writing qualities and fluid wicking rates and fluid absorption capacities.

As the constituents of feedstock 24 travel through die 34 and are compacted and heated, as shown in partially compacted state 30, nearly fully compacted state 31 and fully compacted state 32, tacky portions of their surfaces are brought into contact and preferably a squeezing contact, against one another at contact and/or cross-over points, thus squeezing out the water molecules and adhering to one another at said points to form a cohesive thermoplastic bond at said points.

In accordance with the present invention, an adhesive-free and plasticizer-free cohesive thermoplastic bond is a bond formed between two polymeric thermoplastic initially separate bodies by heating their surfaces uniformly and rapidly using a hot non-reactive (adhesive-free and plasticizer-free) liquid, vapor or gas to reach at least a tackiness or stickiness state, effecting a contact between the two bodies to cause their tacky or sticky surfaces to contact one another and maintaining said contact while the two bodies are cooled.

The combination of conditions described above yielded unexpected characteristics of the bonded article, namely stiff high quality fibrous rods though the feedstock fibers are adhesive-free and plasticizer-free and were heated with adhesive-free and plasticizer-free hot water at a temperature not exceeding, and preferably lower than but near (for example 5–15 degrees lower than), their surface material melting temperature. The nibs fabricated from the obtained rods are unexpectedly uniformly bonded throughout their cross-section and length, surface-glaze-free and have excellent writing quality, a smooth and objectionable (scratchy) noise-free sliding contact with regular paper and film, a fast wicking rate and a high fluid absorption capacity. The nibs obtained in accordance with the above described method are also unexpectedly grindable, machinable, for example on a lathe or a milling machine, drillabale, sandable, using regular sand paper and can be cut using sharp blades, knives or rotary cutting/sawing blades. They can also be sharpened (tapered) in a regular pencil sharpener in the same manner pencils are sharpened. As such, they can be ground, sanded, cut, machined or sharpened into virtually any shape and dimensions. For example, a die 34, with a sizing diameter d=5/8" was fed with a lightly needled nonwoven web of a basis weight of 8 oz/square yard and a width of 9.5". The web was made of the same 50/50 blend described earlier and was compacted, bonded and shaped into a circular stiff fibrous rod of 5/8" diameter using the same method and conditions described earlier. The resulting rod (5/8" diameter) was turned on a lathe into an integral construction nib and ink reservoir 40 of the shape and dimensions shown in FIG. 1-A and a blind hole 44 was drilled into its barrel or ink reservoir section 41. As shown in FIG. 1-B, the integral unitary construction of barrel and nib was placed in a plastic casing 45 of the shape and dimensions shown. Subsequently, 8 cubic centimeters of marker ink were injected into blind hole 44 and were immediately absorbed by the barrel or ink reservoir 41. Within few seconds, the writing tip 43 of the integral construction barrel and nib was saturated with ink through capillary flow and was ready for writing, marking or highlighting applications. A stop 46 was also applied on the barrel opening of plastic casing 45 which served the purpose of sealing the barrel zone in order to minimize evaporation of ink and to support the ink reservoir or barrel end 41 and prevent it from sliding backwards during writing and pressing on writing tip 43. A cap 47 was also used to cover the writing tip end of plastic casing 45.

A method for making a bonded stiff porous thermoplastic article, comprising the steps of:

forming a coherent fibrous structure, said structure comprising thermoplastic fibers being initially capable of moving relative to one another and having an initial structural packing factor, said thermoplastic fibers having at least portions of their surface material being of a melting point $T_1$ not exceeding the melting point of the remaining portions of said thermoplastic fibers, said coherent fibrous structure having an initial bending rigidity $E_1L_1$, feeding said coherent fibrous structure through the inlet opening of a forming die, said forming die having a compaction zone a bonding zone and a shaping zone, heating said fibrous structure uniformly by surrounding said fibrous structure with a fluid at a temperature at or near $T_1$, melting at least fractions of said at least portions of said surface material, passing said structure through said compaction zone and said bonding zone of said forming die, wherein said thermoplastic fibers are laterally compacted together to a structural packing factor higher than said initial structural packing factor thereby causing said fractions to adhere to one another at their respective interfaces, passing said structure through said shaping zone of said forming die wherein the cross-section of said structures is shaped into a predetermined desired shape, cooling said structure thereby causing said thermoplastic fibers to become substantially incapable of moving relative to one another at said respective interfaces, thereby increasing the bending rigidity of said coherent fibrous structure to a magnitude higher than E1I1, and withdrawing said elongated fibrous structure through the exit opening of said forming die.

The invention claimed is:

1. A method of making an adhesive-free and plasticizer-free bonded hollow porous thermoplastic article, said article having a porous fibrous structure and capable of transporting fluid through its body by capillary action, said method consisting of the steps of:

forming a coherent fibrous structure, said structure comprising feedstock strands comprising thermoplastic fibers being initially capable of moving relative to one another, said structure having an initial structural packing factor, said thermoplastic fibers being 100% polyethylene terephthalate bicomponent fibers and having sheath portions of their surface material being of a melting point T1 not exceeding the melting point of the remaining portions of said thermoplastic fibers, said coherent fibrous structure having an initial bending rigidity, feeding said coherent fibrous structure through the inlet opening of a spider-type mandrel forming die, said forming die having a compaction zone, a bonding zone and a shaping zone, heating said fibrous structure uniformly by surrounding said fibrous structure with a fluid at a temperature at or near said melting point T1, thereby rapidly and uniformly heating at least the surface of said thermoplastic fibers to a temperature sufficient to cause melting at least fractions of said portions of said surface material, passing said structure through said compaction zone and said bonding zone of said forming die, wherein said thermoplastic fibers are laterally compacted together to a structural packing factor higher than said initial structural packing factor thereby causing said fractions to adhere to one another at their respective interfaces, passing said structure through said shaping zone of said forming die wherein the cross-section of said structure is shaped into a predetermined desired shape bonded hollow fibrous article, allowing said bonded hollow fibrous article to cool down upon exiting from said die, cooling said structure thereby causing said thermoplastic fibers to become substantially incapable of moving relative to one another at said respective interfaces, thereby increasing the bending rigidity of said coherent fibrous structure to a magnitude higher than said initial bending rigidity, thereby forming the adhesive-free, bonded hollow porous polymeric thermoplastic article, and withdrawing said fibrous structure through the exit opening of said forming die.

* * * * *